(12) United States Patent
Warde-Farley et al.

(10) Patent No.: US 11,727,281 B2
(45) Date of Patent: *Aug. 15, 2023

(54) UNSUPERVISED CONTROL USING LEARNED REWARDS

(71) Applicant: DeepMind Technologies Limited, London (GB)

(72) Inventors: David Constantine Patrick Warde-Farley, Montreal (CA); Volodymyr Mnih, Toronto (CA)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,350

(22) Filed: Jan. 27, 2022

(65) Prior Publication Data

US 2022/0164673 A1 May 26, 2022

Related U.S. Application Data

(63) Continuation of application No. 16/416,920, filed on May 20, 2019, now Pat. No. 11,263,531.

(60) Provisional application No. 62/673,828, filed on May 18, 2018.

(51) Int. Cl.
*G06N 3/088* (2023.01)
(52) U.S. Cl.
CPC .................................. *G06N 3/088* (2013.01)
(58) Field of Classification Search
CPC ........ G06N 3/088; G06N 3/0454; G06N 3/08; G06N 3/006; G06N 3/0445
See application file for complete search history.

(56) References Cited

U.S. PATENT DOCUMENTS 11,263,531 B2 * 3/2022 Warde-Farley ........ G06N 3/088
2019/0354869 A1 11/2019 Constantine et al.

OTHER PUBLICATIONS

Andrychowicz et al., "Hindsight Experience Replay," Advances in Neural Information Processing Systems 30, Jul. 2017, 11 pages.
Arjovsky et al., "Wasserstein GAN," arXiv preprint arXiv:1701.07875, Dec. 2017, 32 pages.

(Continued)

*Primary Examiner* — Robert G Bachner
(74) *Attorney, Agent, or Firm* — Fish & Richardson P.C.

(57) ABSTRACT

Methods, systems, and apparatus, including computer programs encoded on a computer storage medium, for selecting actions to be performed by an agent that interacts with an environment. In one aspect, a system comprises: an action selection subsystem that selects actions to be performed by the agent using an action selection policy generated using an action selection neural network; a reward subsystem that is configured to: receive an observation characterizing a current state of the environment and an observation characterizing a goal state of the environment; generate a reward using an embedded representation of the observation characterizing the current state of the environment and an embedded representation of the observation characterizing the goal state of the environment; and a training subsystem that is configured to train the action selection neural network based on the rewards generated by the reward subsystem using reinforcement learning techniques.

20 Claims, 3 Drawing Sheets

(56) References Cited

OTHER PUBLICATIONS

Bahdanau et al., "Learning to Follow Language Instructions with Adversarial Reward Induction," CoRR, Jun. 2018, arxiv.org/abs/1806.01946v1, 17 pages.
Barber et al., "Information Maximization in Noisy Channels: A Variational Approach," Advances in Neural Information Processing Systems 16, 2004, 8 pages.
Beattie et al., "DeepMind Lab," arXiv preprint arXiv:1612.03801, Dec. 2016, 11 pages.
Bellemare et al., "The arcade learning environment: An evaluation platform for general agents," Journal of Artificial Intelligence Research, Jun. 2013, 47: 253-279.
Bengio et al., "Quick training of probabilistic neural nets by importance sampling," Proceedings of the conference on Artificial Intelligence and Statistics (AISTATS), Jan. 2003, 9 pages.
Chiappa et al., "Recurrent environment simulators," CoRR, Apr. 2017, arxiv.org/abs/1704.02254, Apr. 2017, 61 pages.
Espeholt et al., "IMPALA: Scalable Distributed Deep-RL with Importance Weighted Actor-Learner Architectures," arXiv preprint arXiv:1802.01561, last revised Jun. 2018, 22 pages.
Eysenbach et al., "Diversity is All You Need: Learning Skills without a Reward Function," arXiv preprint arXiv:1802.06070, Oct. 2018, 22 pages.
Florensa et al, "Automated goal generation for reinforcement learning agents," arXiv, Jul. 23, 2018, 14 pages.
Florensa et al., "Stochastic Neural Networks for Hierarchical Reinforcement Learning," CoRR, Apr. 2017, arxiv.org/abs/1704.03012, 17 pages.
Ganin et al., "Synthesizing Programs for Images using Reinforced Adversarial Learning," arXiv preprint arXiv:1804.01118, Apr. 2018, 12 pages.
Goodfellow et al., "Generative Adversarial Networks," CoRR, Jun. 2014, arxiv.org/abs/1406.2661, 9 pages.
Gregor et al., "Variational Intrinsic Control," CoRR, Nov. 2016, arxiv.org/abs/1611.07507, 15 pages.
Gu et al., "Continuous Deep Q-Learning with Model-based Acceleration," Proceedings of the 33rd International Conference on Machine Learning, Jun. 2016, 10 pages.
Ha et al., "World Models," arXiv preprint arXiv:1803.10122, last revised May 2018, 21 pages.
Held et al., "Automatic Goal Generation for Reinforcement Learning Agents," CoRR, May 2017, arxiv.org/abs/1705.06366v2, 12 pages.
Ho et al., "Generative adversarial imitation learning," Advances in Neural Information Processing Systems, 2016, 9 pages.
Horgan et al., "Distributed Prioritized Experience Replay," https://arxiv.org/abs/1803.00933s, Mar. 2018, 19 pages.
Kaelbling, "Learning to Achieve Goals," retrieved from URL <https://pdfs.semanticscholar.org/6df4/3f70f383007a946448122b75918e3a9d6682.pdf>, Aug. 1993, 5 pages.
Kulesza et al., "Determinantal Point Processes for Machine Learning," Foundations and Trends in Machine Learning, Dec. 2012, 5(2-3):123-286.
Lafferty et al., "Conditional Random Fields: Probabilistic Models for Segmenting and Labeling Sequence Data," retrieved from URL <https://access.cs.sci.ku.ac.th/~usa/418591/2010-1/practice/sutee/CRF.pdf>, Jun. 2001,8 pages.
Lake et al., "Building Machines That Learn and Think Like People," https://arxiv.org/abs/1604.00289, last updated Nov. 2016, 58 pages.
Laversanne-Finot et al., "Curiosity Driven Exploration of Learned Disentangled Goal Spaces," Conference on Robot Learning, Jul. 2018, 18 pages.

Levy et al., "Hierarchical Reinforcement Learning with Hindsight," https://arxiv.org/abs/1805.08180v1, May 2018, 9 pages.
Lin, "Reinforcement Learning for Robots Using Neural Networks," retrieved from URL <https://pdfs.semanticscholar.org/54c4/cf3a8168c1b70f91cf78a3dc98b671935492.pdf>, Jan. 1993, 168 pages.
Machado et al., "A Laplacian Framework for option discovery in reinforcement learning," International Conference on Machine Learning, Aug. 2017, 70: 10 pages.
Machado et al., "Learning Purposeful Behaviour in the Absence of Rewards," arXiv preprint arXiv:1605.07700, May 2016, 9 pages.
Mnih et al., "Human-level control through deep reinforcement learning," Nature, Feb. 2015, 518:529-533.
Mobahi et al., "Deep learning from temporal coherence in video," Proceedings of the 26th Annual International Conference on Machine Learning, Jun. 2009, 737-744.
Nachum et al., "Data-Efficient Hierarchical Reinforcement Learning," arXiv preprint arXiv:1805.08296, last revised Oct. 2018, 17 pages.
Nair et al., "Inferring Motor Programs from Images of Handwritten Digits," retrieved from URL <https://pdfs.semanticscholar.org/3cfe/ac858958469f93f7f45b966b4ffa29c6524a.pdf>, Dec. 2005, 8 pages.
Nair et al., "Visual Reinforcement Learning with Imagined Goals," arXiv preprint arXiv:1807.04742, last revised Dec. 2018, 15 pages.
Oh et al., "Action-Conditional Video Prediction using Deep Networks in Atari Games," https://arxiv.org/abs/1507.08750v2, last revised Dec. 2015, 26 pages.
Pathak et al., "Zero-Shot Visual Imitation," arXiv preprint arXiv:1804.08606, Apr. 2018, 16 pages.
Péré et al., "Unsupervised Learning of Goal Spaces for Intrinsically Motivated Goal Exploration," arXiv preprint arXiv:1803.00781, Oct. 2018, 26 pages.
Riedmiller et al., "Learning by Playing Solving Sparse Reward Tasks from Scratch," International Conference on Learning Representations, Jul. 2018, 10 pages.
Schaul et al., "Universal Value Function Approximators," International Conference on Machine Learning, Jun. 2015, 9 pages.
Sermanet et al., "Time-Contrastive Networks: Self-Supervised Learning from Video," https://arxiv.org/abs/1704.06888v2, Oct. 2017, 15 pages.
Srinivas et al., "Universal Planning Networks," https://arxiv.org/abs/1804.00645, Apr. 2018, 21 pages.
Sutton et al., "Horde: A scalable real-time architecture for learning knowledge from unsupervised sensorimotor interaction," The 10th International Conference on Autonomous Agents and Multiagent Systems, May 2011, 2:761-768.
Tassa et al., "DeepMind Control Suite," arXiv preprint arXiv:1801.00690, Jan. 2018, 24 pages.
Todorov et al., "MuJoCo: A physics engine for model-based control," 2012 IEEE/RSJ International Conference on Intelligent Robots and Systems, Oct. 2012, 5026-5033.
Veeriah et al., "Many-Goals Reinforcement Learning," arXiv preprint arXiv:1806.09605, Jun. 2018, 17 pages.
Vezhnevets et al., "FeUdal Networks for Hierarchical Reinforcement Learning," International Conference on Machine Learning, Aug. 2017, 10 pages.
Vinyals et al., "Matching Networks for One Shot Learning," Advances in Neural Information Processing Systems, Dec. 2016, 9 pages.
Wang et al., "Dueling Network Architectures for Deep Reinforcement Learning," Proceedings of the 33rd International Conference on Machine Learning, Jun. 2016, 9 pages.
Edwards et al., "Cross-Domain Perceptual Reward Functions," CoRR, arXiv: 1705.09045v3, Jul. 25, 2017, 11 pages.
Edwards et al., "Perceptual Reward Functions," CoRR, arXiv:1608.03824v1, Aug. 12, 2016, 8 pages.

\* cited by examiner

UNSUPERVISED CONTROL USING LEARNED REWARDS

CROSS-REFERENCE TO RELATED APPLICATIONS

This patent application is a continuation (and claims the benefit of priority under 35 USC 120) of U.S. patent application Ser. No. 16/416,920, filed May 20, 2019, which claims the benefit under 35 U.S.C. § 119(e) of U.S. Patent Application No. 62/673,828, filed May 18, 2018. The disclosure of the foregoing applications are incorporated herein by reference in its entirety for all purposes.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer.

SUMMARY

This specification describes a system implemented as computer programs on one or more computers in one or more locations that controls an agent interacting with an environment.

According to a first aspect there is provided a system for selecting actions to be performed by an agent that interacts with an environment by performing actions from a predetermined set of actions.

The system includes an action selection subsystem that is configured to, at each of multiple of time steps: receive an observation characterizing a current state of the environment and an observation characterizing a goal state of the environment; process the observation characterizing the current state of the environment and the observation characterizing the goal state of the environment using an action selection neural network to generate an action selection policy; and select an action from the predetermined set of actions to be performed by the agent using the action selection policy.

The system includes a reward subsystem that is configured to, at each of multiple time steps: receive an observation characterizing a current state of the environment and an observation characterizing a goal state of the environment; process the observation characterizing the current state of the environment and the observation characterizing the goal state of the environment using an embedding neural network, where the embedding neural network is configured to process an observation to generate an embedded representation of the observation; and generate a reward using the embedded representation of the observation characterizing the current state of the environment and the embedded representation of the observation characterizing the goal state of the environment.

The system includes a training subsystem that is configured to train the action selection neural network based on the rewards generated by the reward subsystem using reinforcement learning techniques.

In some implementations, the reward subsystem is further configured to: obtain one or more decoy observations, where each decoy observation characterizes a past state of the environment; for each decoy observation, generate an embedded representation of the decoy observation by processing the decoy observation using the embedding neural network; and determine a similarity between the observation characterizing the current state of the environment and the observation characterizing the goal state of the environment using: (i) the embedded representation of the observation characterizing the current state of the environment, (ii) the embedded representation of the observation characterizing the goal state of the environment, and (iii) the embedded representations of the decoy observations.

In some implementations, determining the similarity between the observation characterizing the current state of the environment and the observation characterizing the goal state of the environment includes: for each decoy observation, determining a similarity metric between the embedded representation of the observation characterizing the current state of the environment and the embedded representation of the decoy observation; determining a similarity metric between the embedded representation of the observation characterizing the current state of the environment and the embedded representation of the observation characterizing the goal state of the environment; and determining the similarity between the observation characterizing the current state of the environment and the observation characterizing the goal state of the environment using the determined similarity metrics.

In some implementations, the similarity metric is an inner product.

In some implementations, generating the reward includes generating the reward based on the determined similarity between the observation characterizing the current state of the environment and the observation characterizing the goal state of the environment.

In some implementations, generating the reward includes determining the reward based on a similarity between the embedded representation of the observation characterizing the current state of the environment and the embedded representation of the observation characterizing the goal state of the environment.

In some implementations, the training subsystem is further configured to: determine a gradient of a loss function that depends on the determined similarity between the observation characterizing the current state of the environment and the observation characterizing the goal state of the environment; and adjust current values of embedding neural network parameters using the gradient.

In some implementations, the reward subsystem is configured to generate a predetermined reward if a current time step is not a goal time step.

In some implementations, the system further includes a goal buffer including multiple past observations, and the training subsystem is configured to determine the observation characterizing the goal state of the environment by sampling from the goal buffer.

In some implementations, the training subsystem is configured to update the goal buffer by, at each of multiple time steps, replacing a randomly selected observation from the goal buffer by a current observation with a predetermined probability.

In some implementations, the training subsystem is configured to update the goal buffer by, at each of multiple time steps: randomly selecting a candidate observation from the goal buffer; and determining whether to replace the candidate observation by a current observation based on: (i) an aggregate similarity measure between the current observation and the observations included in the goal buffer, and (ii) an aggregate similarity measure between the candidate observation and the observations included in the goal buffer.

In some implementations, the action selection neural network is a Q neural network and the action selection policy includes a respective Q value for each action in the predetermined set of actions.

In some implementations, selecting an action includes determining an action with a highest Q value.

In some implementations, selecting an action includes selecting the action in accordance with an exploration policy.

In some implementations, the action selection neural network is further configured to process a periodic representation of the current time step.

In some implementations, the training subsystem is configured to train the action selection neural network and the embedding neural network using experience replay.

In some implementations, training the action selection neural network and the embedding neural network using experience replay includes training the action selection neural network and the embedding neural network using hindsight experience replay.

In some implementations, the embedding neural network and the action selection neural network share one or more parameter values.

According to a second aspect there is provided a method performed by one or more data processing apparatus for performing operations including the operations of the first aspect.

According to a third aspect there is provided one or more non-transitory computer storage media storing instructions that when executed by one or more computers cause the one or more computers to perform operations including the operations of the first aspect.

Particular embodiments of the subject matter described in this specification can be implemented so as to realize one or more of the following advantages.

The system described in this specification learns to generate rewards that are used to train an agent to "master" an environment by performing actions that cause the state of the environment to transition into specified "goal" states.

By making use of the learned rewards, the system can train the action selection network even in the absence of an explicit external reward signal, or when the external reward signal is very sparse.

Moreover, using the learned rewards can enable the system to reduce the consumption of computational resources (e.g., memory and computing power) required to train the agent to master the environment relative to using, e.g., hand-crafted rewards. In particular, using the learned rewards can enable the system to train the agent to master the environment over fewer training iterations than would otherwise be necessary. Hand-crafted rewards refer to rewards generated by a reward function that is explicitly defined by a person, rather than being learned using machine learning techniques.

Hand-crafting rewards may be difficult, expensive, and time consuming. For example, in a robotics environment, manually specifying a reward that depends on a robotic agent putting a ball inside a cup may require using image processing techniques to localize the cup and determine that the cup is positioned at an angle such that it could hold the ball. Even after localizing the cup and identifying its orientation, determining whether the ball is inside the cup may require, e.g., obtaining measurements from a weight sensor placed in the cup for this purpose. The system described in this specification obviates certain difficulties associated with hand-crafting rewards by automatically learning to generate rewards.

Many tasks that the agent can perform in the environment (e.g., navigation tasks) implicitly rely on the agent having mastered the environment. By training the agent to master the environment, the system described in this specification can enable the agent to learn how to perform tasks in the environment more quickly, e.g., over fewer training iterations. Therefore, the system described in this specification can reduce the consumption of computational resources required to train the agent to perform tasks in the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
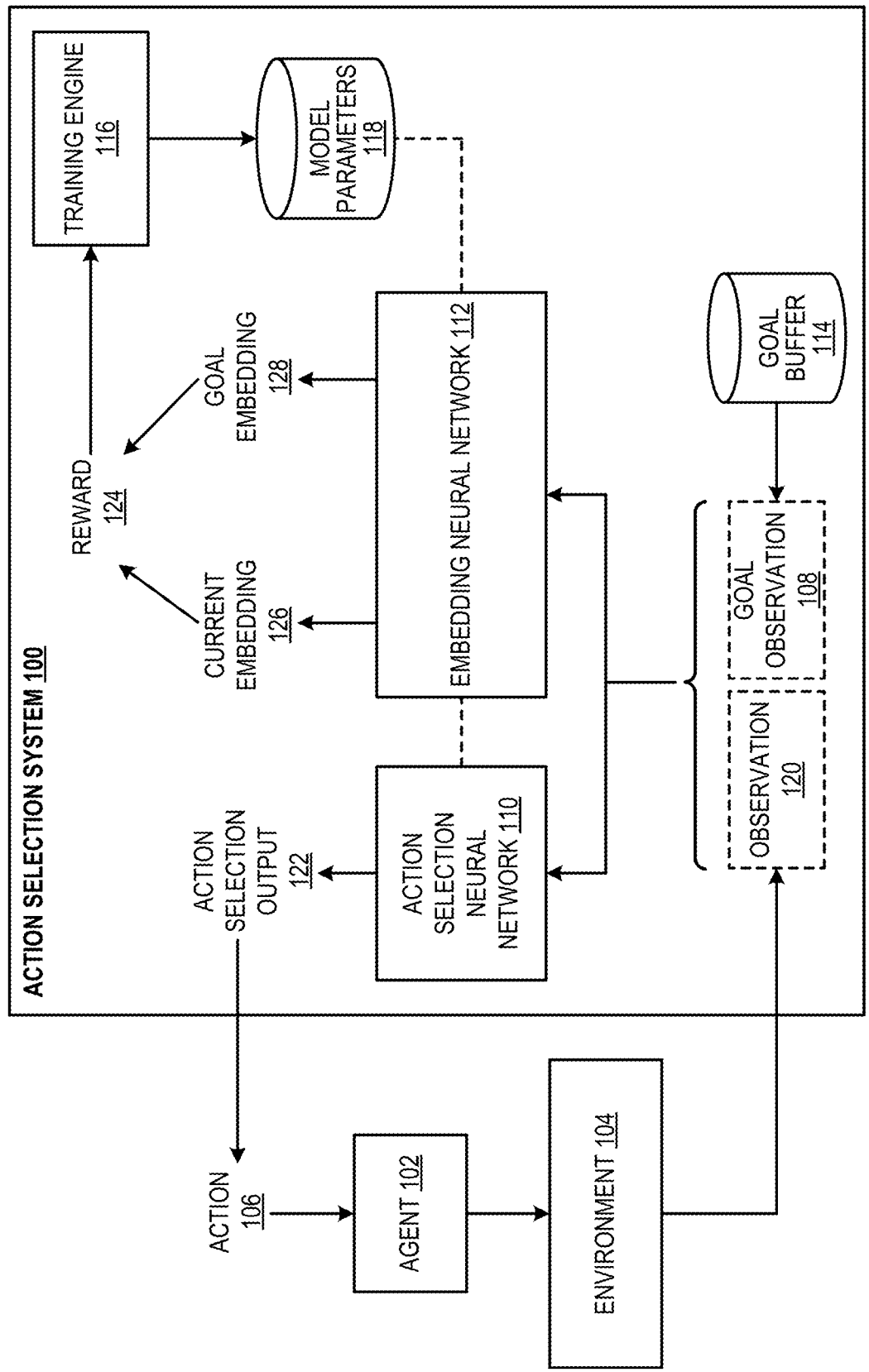
FIG. 1 shows an example action selection system.

This specification describes an action selection system that controls an agent interacting with an environment by, at each of multiple time steps, processing data characterizing the current state of the environment at the time step (i.e., an "observation") to select an action to be performed by the agent.

The action selection system can learn to "master" the environment by selecting actions that cause the state of the environment to transition into specified "goal" states. In particular, the action selection system can jointly learn: (i) an action selection policy, and (ii) a reward function. The action selection policy selects actions to be performed by the agent that cause the state of the environment to transition into a specified goal state. The reward function generates rewards that characterize the similarity of the current state of the environment to the goal state of the environment. The action selection system can learn the action selection policy based on the rewards generated by the reward function using reinforcement learning techniques.

At each time step, the state of the environment at the time step depends on the state of the environment at the previous time step and the action performed by the agent at the previous time step.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game. Generally, in the case of a simulated environment, the observations may include simulated versions of one or more of the previously described observations or types of observations and the actions may include simulated versions of one or more of the previously described actions or types of actions.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g. to adjust or turn on/off components of the plant/facility.

These features and other features are described in more detail below.

FIG. 1 shows an example action selection system 100. The action selection system 100 is an example of a system implemented as computer programs on one or more computers in one or more locations in which the systems, components, and techniques described below are implemented.

The system 100 controls an agent 102 interacting with an environment 104 by selecting actions 106 to be performed by the agent 102 that cause the state of the environment to transition into a goal state specified by a goal observation 108.

The system 100 includes an action selection neural network 110, an embedding neural network 112, a goal buffer 114, a training engine 116, and a set of model parameters 118 of the action selection network 110 and the embedding network 112.

At each of multiple time steps, the action selection network 110 is configured to process: (i) a current observation 120 characterizing the current state of the environment 104, and (ii) a goal observation 108 characterizing a goal state of the environment 104, to generate an action selection output 122 ("action selection policy"). The system 100 uses the action selection output 122 to select the action 106 to be performed by the agent at the current time step. A few examples of using the action selection output 122 to select the action 106 to be performed by the agent are described next.

In one example, the action selection output 122 may include a respective numerical probability value for each action in a set of possible actions that can be performed by the agent. The system 100 can select the action to be performed by the agent, e.g., by sampling an action in accordance with the probability values for the actions, or by selecting the action with the highest probability value.

In another example, the action selection output 122 may directly define the action to be performed by the agent, e.g., by defining the values of torques that should be applied to the joints of a robotic agent.

In another example, the action selection output 122 may include a respective Q-value for each action in the set of possible actions that can be performed by the agent. The system 100 can process the Q-values (e.g., using a soft-max function) to generate a respective probability value for each possible action, which can be used to select the action to be performed by the agent (as described earlier). The system 100 could also select the action with the highest Q-value as the action to be performed by the agent.

The Q value for an action is an estimate of a "return" that would result from the agent performing the action in response to the current observation 120 and thereafter selecting future actions performed by the agent 102 in accordance with current values of the action selection network parameters.

A return refers to a cumulative measure of "rewards" 124 received by the agent, for example, a time-discounted sum of rewards. The agent can receive a respective reward 124 at each time step, where the reward 124 is specified by a scalar numerical value and characterizes, e.g., a progress of the agent towards reaching the goal state. The system 100 determines the rewards 124 received by the agent 102 using the embedding network 112, as will be described in more detail below.

In some cases, the system 100 can select the action to be performed by the agent in accordance with an exploration policy. For example, the exploration policy may be an $\epsilon$-greedy exploration policy, where the system 100 selects the action to be performed by the agent in accordance with the action selection output 122 with probability $1-\epsilon$, and randomly selects the action with probability $\epsilon$. In this example, $\epsilon$ is a scalar value between 0 and 1.

The action selection network 110 can have any of a variety of neural network architectures. For example, the architecture of the action selection network 110 may include a sequence of one or more convolutional layers, followed by a recurrent layer (e.g., a long short-term memory (LSTM) layer) and a linear output layer. The action selection network may process both the current observation 120 and the goal observation 108 using the convolutional layers to generate respective intermediate outputs, and thereafter concatenate the intermediate outputs before providing them to the recurrent layer and the linear output layer. The output layer may include a respective neuron corresponding to each possible action that can be performed by the agent, and the activation of each neuron may specify the Q value of the action corresponding to the neuron.

The embedding neural network is configured to process an observation characterizing a state of the environment (e.g., a current observation 120 or a goal observation 108) to generate an embedding of the observation. An embedding of an observation refers to a representation of the observation as an ordered collection of numerical values, e.g., a vector or matrix of numerical values.

The embedding network 112 can have any of a variety of neural network architectures. For example, the embedding network 112 may include a sequence of one or more convolutional layers followed by a fully-connected output layer. In some implementations, the convolutional layers of the embedding network 112 may share the same parameter values as the convolutional layers of the action selection network 110 (as described earlier). The embedding network 112 may normalize the embedding generated by the output layer, e.g., by dividing each component of the embedding by the $L_2$-norm of the embedding.

At some or all of the time steps, the system 100 determines the reward 124 received by the agent 102 at the time step using the embedding network 112 (i.e., the embedding network defines the "reward function" used by the system 100). In particular, to determine the reward 124 received by the agent at a time step, the system 100 processes the current observation 120 and the goal observation 108 using the embedding network 112 to generate an embedding 126 of the current observation and an embedding 128 of the goal observation. Thereafter, the system 100 determines the reward 124 received by the agent at the time step based on the respective embeddings 126 and 128 of the current observation 120 and the goal observation 108.

The system 100 may generate a higher reward if the embedding of the current observation 120 is more similar (e.g., according to an appropriate numerical similarity measure) to the embedding of the goal observation 108. An example process for determining the reward 124 based on the respective embeddings of the current and goal observations is described in more detail with reference to FIG. 2.

During training, the system 100 may select a goal observation 108, and cause the agent 102 to interact with the environment 104 to attempt to achieve the goal state specified by the goal observation 108 for one or more time steps, referred to as an "episode". The system 100 may determine the reward received by the agent to be zero (i.e., by default) at each time step until the final time step of the episode. At the final time step of the episode, the system 100 may determine the reward 124 received by the agent using the embedding network 112, as described above.

The system 100 can determine the number of time steps in an episode in any of a variety of ways. For example, the system 100 can determine each episode to have a fixed number of time steps, e.g., 100 time steps. As another example, the system 100 can adaptively determine the number of time steps in each episode by setting a maximum number of time steps, but terminating the episode early if a similarity measure between the respective embeddings of the current and goal observations satisfies a predetermined threshold.

The system 100 may select the goal observation 108 at the start of each episode from a goal buffer 114 that stores previous observations of the environment. For example, the system 100 may randomly sample the goal observation 108 from the goal buffer 114 at the start of each episode.

The system 100 may continually update the goal buffer 114 by adding new observations (potentially overwriting previous observations) as the agent 102 interacts with the environment. An example process for updating the goal buffer 114 is described in more detail with reference to FIG. 3.

The training engine 116 is configured to jointly train the model parameters 118 of the action selection network 110 and the embedding network 112 based on the interactions of the agent with the environment. In particular, the training engine 116 can train the action selection network 110 to increase the return (i.e., cumulative measure of reward) received by the agent using reinforcement learning techniques. The system 100 can train the embedding neural network to increase a similarity measure between the embeddings of: (i) the observation of the environment at the final time step of an episode, and (ii) the goal observation of the environment corresponding to the episode.

In some implementations, the training engine 116 can train the system 100 based on rewards 124 generated using the embedding network 112 for a first number of training iterations, before replacing the rewards 124 generated using the embedding network 112 with external rewards. An external reward refers to a reward that is provided to the system by an external source.

In some implementations, the system can combine the rewards 124 generated using the embedding network 112 with external rewards, e.g., by generating an overall reward at each time step by adding the reward 124 and the external reward.

In some implementations, the action selection network 110 may share parameter value with an additional action selection network that is configured to generate additional action selection outputs that are directed to causing the agent to perform an additional task. The training engine 116 can train the action selection network 110 using the rewards 124 generated using the embedding network 112, and can train the additional action selection network using, e.g., external rewards. The shared parameters of the two action selection networks would be trained based on both the internal rewards 124 and the external rewards.

Figure 2:
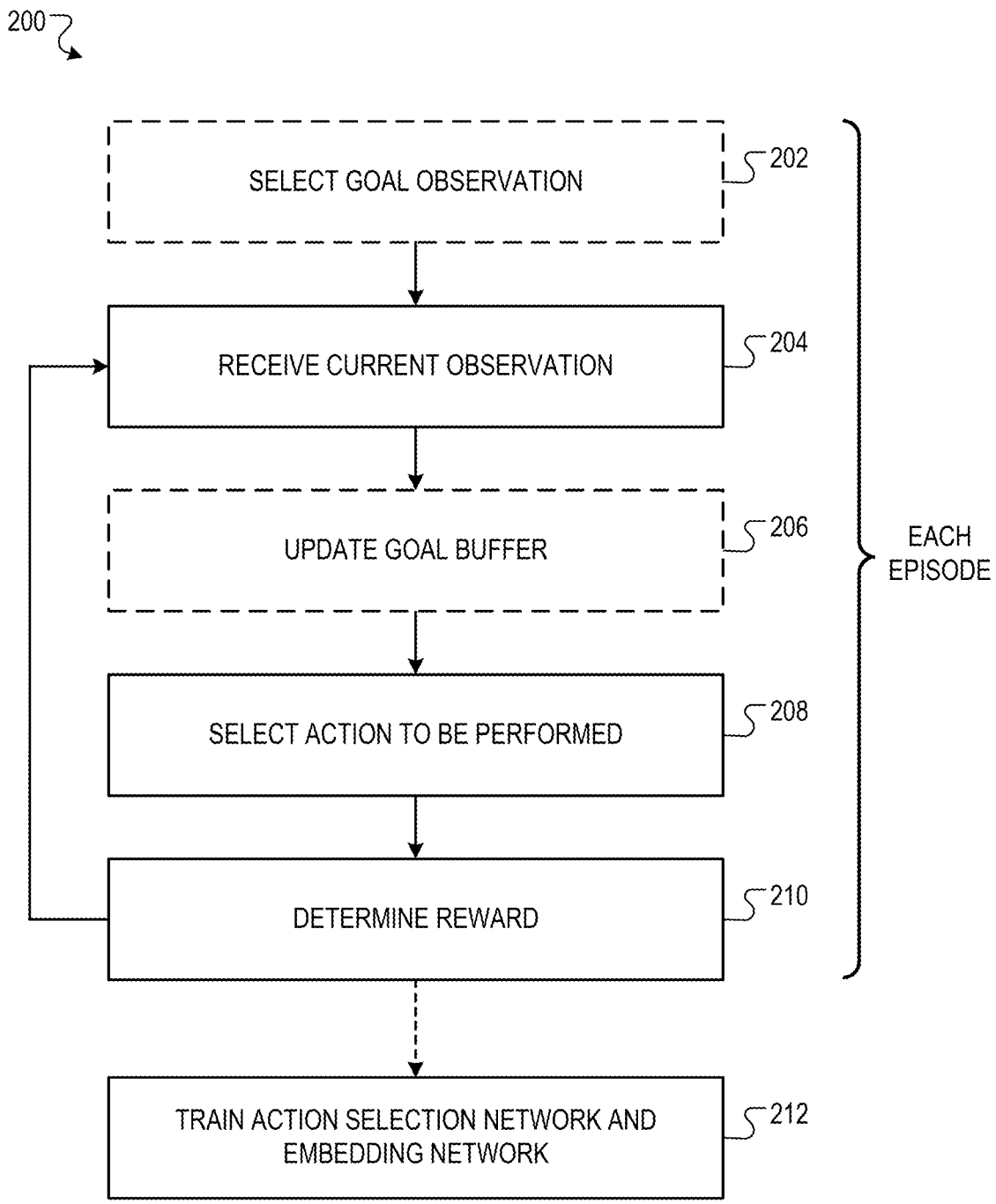
FIG. 2 is a flow diagram of an example process for jointly training the action selection network and the embedding network.

FIG. 2 is a flow diagram of an example process 200 for jointly training the action selection network and the embedding network. For convenience, the process 200 will be described as being performed by a system of one or more computers located in one or more locations. For example, an action selection system, e.g., the action selection system 100 of FIG. 1, appropriately programmed in accordance with this specification, can perform the process 200.

Steps 202 to 210 of the process 200 correspond to a given episode. For convenience, each of the steps 202 to 210 are described with reference to a "current" time step.

If the current time step is the first time step of an episode, the system selects a goal observation for the episode from a goal buffer (202). The goal buffer stores multiple previous observations of the environment. The system may select the goal observation, e.g., by randomly sampling an observation from the goal buffer. The goal buffer may, in some cases, store additional data associated with each observation in the goal buffer, e.g., how recently the observation was encountered, and the system can select the goal based at least in part on this additional data.

While this specification mainly describes the goal observation as being selected from a goal buffer, other implementations are possible. An example process for selecting a goal observation without using a goal buffer is described with reference to: C. Florensa, D. Held, X. Geng, P. Abbeel: "Automated goal generation for reinforcement learning agents", arXiv:1705.06366v5 (2018).

The system receives an observation characterizing the current state of the environment (204). The current observation may be generated by or derived from sensors of the agent. For example, the current observation may include one or more of: a color image captured by a camera sensor of the agent, a hyperspectral image captured by a hyperspectral sensor of the agent, and geometric data captured by a laser sensor of the agent.

Optionally, the system can use the current observation to update the goal buffer (206). For example, if the goal buffer is not "full" (i.e., if the goal buffer currently stores fewer than a predetermined maximum number of observations), the system can store the current observation in the goal buffer. If the goal buffer is full, the system can store the current observation in the goal buffer with a predetermined probability (e.g., 25%). For example, the system can replace a randomly selected observation from the goal buffer with the current observation with the predetermined probability. Another example process for updating the goal buffer is described with reference to FIG. 3.

The system selects the action to be performed by the agent at the current time step (208). In particular, the system processes the current observation and the goal observation using the action selection network to generate an action selection output, and thereafter selects the action based on the action selection output. In one example, the action selection neural network is a Q neural network and the action selection output defines a respective Q value for each action in a predetermined set of actions. In this example, the system may select the action with a highest Q value.

In some implementations, the action selection network processes other inputs in addition to the current observation and the goal observation. For example, the action selection network may process an input that includes a periodic representation of the current time step, e.g.:

$$\left[\sin\frac{2\pi t}{T}, \cos\frac{2\pi t}{T}\right] \quad (1)$$

where t indexes the current time step and T is a predetermined number of time steps in the current episode. Processing the periodic representation of the current time step can enable the action selection system to select actions that cause the agent to achieve goals states which may be unmaintainable due to their instability in the environment dynamics.

The system determines the reward for the current time step (210). To determine the reward for the time step, the system may generate an embedding of the current observation and an embedding of the goal observation by processing the current observation and the goal observation using the embedding neural network. The system may then determine the reward using the respective embeddings of the current observation and the goal observation. A few examples of generating the reward follow.

In one example, the system may determine the reward based on a similarity measure between the embedding of the current observation and the embedding of the goal observation, e.g.:

$$r=\max(0, \mathcal{S}(e(s),e(g))) \quad (2)$$

where r is the reward, e(s) is the embedding of the current observation, e(g) is the embedding of the goal observation, and $\mathcal{S}(\cdot,\cdot)$ is a similarity measure, e.g., an inner product similarity measure.

In another example, to determine the reward, the system may obtain one or more "decoy" observations that each characterize a respective previous state of the environment, e.g., by randomly sampling them from the goal buffer. The system may then process each of the decoy observations using the embedding network to generate a respective embedding of each decoy observation, and determine the reward based on the embeddings of: (i) the current observation, (ii) the goal observation, and (iii) the decoy observations. In a particular example, the system may determine the reward as:

$$r = \frac{\exp(\beta \cdot \mathcal{S}(e(s), e(g)))}{\exp(\beta \cdot \mathcal{S}(e(s), e(g))) + \Sigma_{k=1}^{K}\exp(\beta \cdot \mathcal{S}(e(s), e(d_k)))} \quad (3)$$

where r is the reward, e(s) is embedding of the current observation, e(g) is the embedding of the goal observation, k indexes the decoy observations, K is the total number of decoy observations, $e(d_k)$ is the embedding of the k-th decoy observation, β is an inverse temperature parameter (e.g., set to K+1), and $\mathcal{S}(\cdot,\cdot)$ is a similarity measure, e.g., an inner product similarity measure.

For computational efficiency, the system may generate the embedding of the goal observation at the first time step of the episode and reuse the embedding of the goal observation at each subsequent time step of the episode rather than re-generating it.

In some cases, the system may determine the reward using the embeddings of the goal and current observations for only the final time step of the episode. For each time step preceding the final time step, the system may generate a default (i.e., predetermined) reward, e.g., a reward of zero.

If the current time step is not the final time step of the episode, the system can return to step 204 and continue the current episode by repeating steps 204-210. If the current time step is the final time step of the episode, the system can return to step 202 and start a new episode.

As the agent interacts with the environment, the system trains the action selection network and the embedding network by repeatedly updating their respective parameter values based on data characterizing the interaction of the agent with the environment (212).

The data characterizing the interaction of the agent with the environment during an episode can be referred to as a "trajectory" and may specify:

$$(s_{1:T}, a_{1:T}, r_{1:T}, g) \quad (4)$$

where $s_{1:T}$ represents observations characterizing the states of the environment during the episode, $a_{1:T}$ represents the actions performed by the agent during the episode, $r_{1:T}$ represents the rewards received during the episode, and $g$ represents the goal observation for the episode.

The system trains the action selection network using reinforcement learning training techniques, based on the rewards received by the agent during an episode, to increase a cumulative measure of rewards received by the agent as a result of interacting with the environment. The system can train the action selection network using any appropriate reinforcement learning training technique, e.g., an actor-critic technique or a Q learning technique, e.g., an n-step Q learning technique. In particular, the system can train the action selection network by iteratively adjusting the parameter values of the action selection network using gradients of a reinforcement learning objective function, e.g., by stochastic gradient descent techniques. The system can use the gradients to adjust the parameter values of the action selection network using any appropriate gradient descent optimization technique, e.g., an Adam or RMSprop gradient descent optimization technique.

The system can train the embedding network to increase a similarity measure between: (i) the embedding of the observation corresponding to the final time step of an episode, and (ii) the embedding of the goal observation for the episode. For example, the system can train the embedding network by iteratively adjusting the parameter values of the embedding network using gradients of a loss function $\mathcal{L}$, e.g., using stochastic gradient descent techniques, where $\mathcal{L}$ is given by:

$$\mathcal{L} = \frac{\exp(\beta \cdot \mathcal{S}(e(s_T), e(g)))}{\exp(\beta \cdot \mathcal{S}(e(s_T), e(g))) + \Sigma_{k=1}^{K} \exp(\beta \cdot \mathcal{S}(e(s_T), e(d_k)))} \quad (5)$$

where $e(s_T)$ is embedding of the observation corresponding to the final time step of an episode, $e(g)$ is the embedding of the goal observation, k indexes the decoy observations, K is the total number of decoy observations, $e(d_k)$ is the embedding of the k-th decoy observation, $\beta$ is an inverse temperature parameter (e.g., set at K+1), and $\mathcal{S}(\cdot,\cdot)$ is a similarity measure, e.g., an inner product similarity measure. The system can use the gradients to adjust the parameter values of the embedding network using any appropriate gradient descent optimization technique, e.g., an Adam or RMSprop gradient descent optimization technique.

In some cases, the system trains the action selection network and the embedding network using experience replay. More specifically, the system stores trajectories (e.g., as described with reference to equation (4)) corresponding to multiple episodes in a data store, and trains the action network and the embedding network on trajectories sampled from the data store. In these implementations, the system may train the action selection network using off-policy reinforcement learning techniques, to account for differences potential differences between: (i) the current values of the action selection network parameters, and (ii) the values of the action selection network parameters when the trajectories were generated.

The system may use a particular variant of experience replay, referred to as hindsight experience replay, during training of the action selection network and the embedding network. In hindsight experience replay, the system can adjust one or more trajectories from the data store by: (i) replacing the goal observation from the trajectory with an observation randomly sampled from the final H steps of the trajectory (where H is a positive integer value), and (ii) replacing the reward from the final time step of the trajectory, e.g. with the maximum possible reward. Using hindsight experience replay may enable the system to train the action selection network and embedding network more effectively, e.g., over fewer training iterations. For example, using hindsight experience replay enable the action selection network to be trained more effectively by artificially generating "successful" trajectories, i.e., where the agent has reached (or approximately reached) the goal state. As another example, using hindsight experience replay may regularize the training of the embedding network by encouraging the embedding network to generate temporally consistent observation embeddings, i.e., where observations that are nearby in time have similar embeddings.

Jointly training the action selection network and the embedding network can enable the system to learn to generate rewards that implicitly measure similarity in the space of "controllable" aspects of the environment instead of in the space of raw observations of the environment. An aspect of the environment is said to be controllable if it is controlled by the actions performed by the agent. For example, for a robotic agent, the position of an actuator of the agent may be a controllable aspect of the environment, while the ambient lighting conditions and the movement of "distractor" objects in the vicinity of the agent may be uncontrollable aspects of the environment.

Using learned rewards that measure similarity in controllable aspects of the environment can enable the system to effectively learn to approximately achieve goal states that are not perfectly reachable, e.g., due to aspects of the environment outside of the control of the agent. For example, the system can train a robotic agent to maneuver an actuator to a goal position independently of variations in the ambient lighting conditions and the movement of distractor objects in the vicinity of the agent. In contrast, using rewards that directly measure similarity between states of the environment in the space of raw observations (e.g., by a pixel-level comparison of images of the environment) may cause the system to master the environment more slowly (or not at all).

Figure 3:
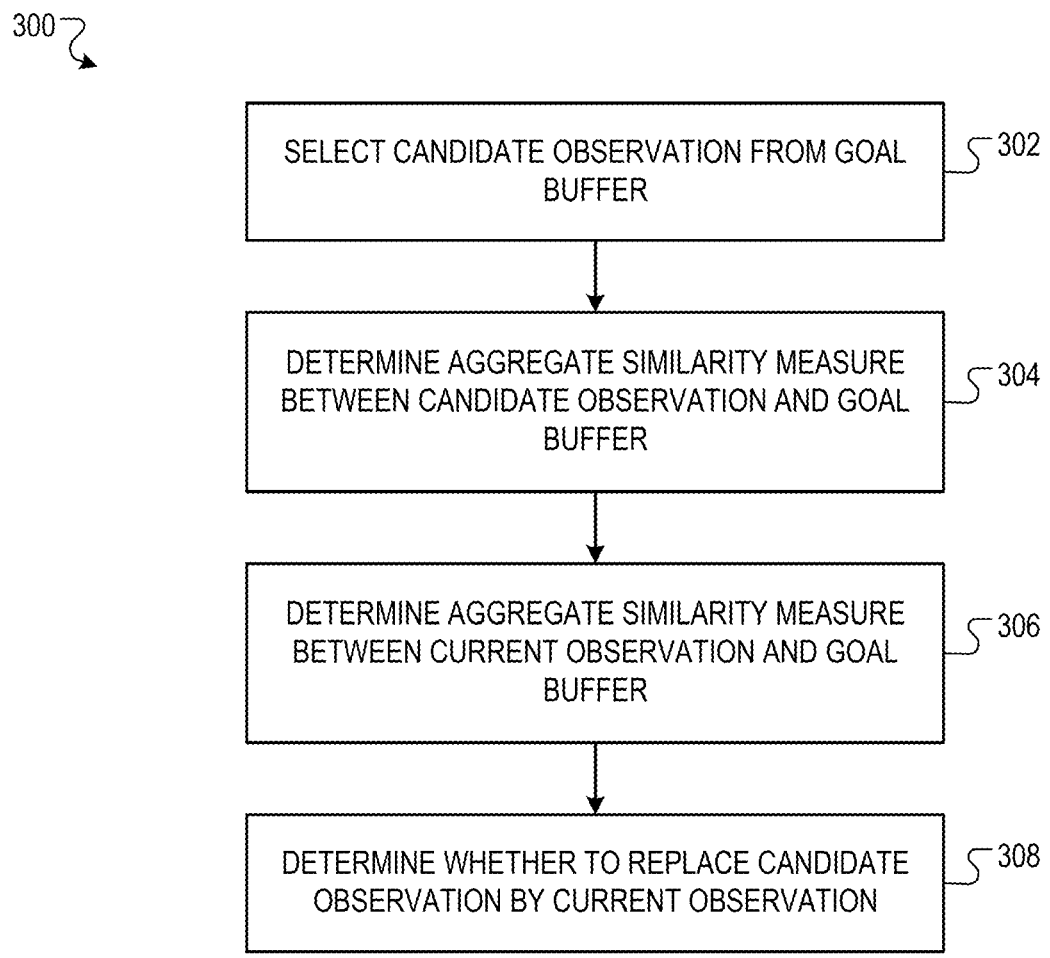
FIG. 3 is a flow diagram of an example process for determining whether to update the goal buffer with a current observation at a given time step.

FIG. 3 is a flow diagram of an example process 300 for determining whether to update the goal buffer with a current observation at a given time step. Prior to the first step of the process 300, the system may sample a Bernoulli random variable, and thereafter determine that the current observation is eligible to update the goal buffer only if the random variable assumes a specified value (e.g., the value 1). For convenience, the process 300 will be described as being performed by a system of one or more computers located in one or more locations. For example, an action selection system, e.g., the action selection system 100 of FIG. 1, appropriately programmed in accordance with this specification, can perform the process 300.

The system selects a candidate observation from the goal buffer (302). For example, the system may select the candidate observation by randomly sampling from the goal buffer.

The system determines an "aggregate" similarity measure between: (i) the candidate observation, and (ii) the remaining observations (i.e., other than the candidate observation) in the goal buffer (304). For example, the system may determine the aggregate similarity measure as:

$$\frac{1}{N-1}\sum_{k=1}^{N-1}\mathcal{S}(c, d_k) \qquad (6)$$

where N is the total number of observations in the goal buffer, c is the candidate observation, k indexes the remaining observations in the goal buffer, $d_k$ is the k-th remaining observation in the goal buffer, and $S(\cdot,\cdot)$ is a similarity measure, e.g., an $L_2$ similarity measure.

The system determines an aggregate similarity measure between: (i) the current observation, and (ii) the remaining observations (i.e., other than the candidate observation) in the goal buffer (306). For example, the system may determine the aggregate similarity measure as:

$$\frac{1}{N-1}\sum_{k=1}^{N-1}\mathcal{S}(s, d_k) \qquad (7)$$

where s is the current observation, and the remaining variables are defined in the same manner as for equation (6).

The system determines whether to update the goal buffer with the current observation based on the aggregate similarity measures determined at steps 304 and 306 (308). For example, if the aggregate similarity measures indicate that the candidate observation is more similar to the remaining observations than the current observation, the system may replace the candidate observation with the current observation. On the other hand, if the aggregate similarity measures indicate that the current observation is more similar to the remaining observations than the candidate observation, the system may replace the candidate observation with the current observation with a predetermined probability that is strictly less than one.

Determining whether to update the goal buffer in this manner can increase the diversity of the observations in the goal buffer, which can enhance the training of the action selection network and the embedding network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    selecting actions to be performed by an agent that interacts with an environment by performing actions from a predetermined set of actions, comprising, at each of a plurality of time steps:

receiving an observation characterizing a current state of the environment at the time step and an observation characterizing a goal state of the environment at the time step;

processing the observation characterizing the current state of the environment at the time step and the observation characterizing the goal state of the environment at the time step using an action selection neural network to generate an output comprising an action selection policy; and selecting an action from the predetermined set of actions to be performed by the agent at the time step using the action selection policy;

wherein the action selection neural network has been trained by operations comprising, for each of a plurality of training time steps:

receiving an observation characterizing a current state of the environment at the training time step and an observation characterizing a goal state of the environment at the training time step;

processing the observation characterizing the current state of the environment at the training time step and the observation characterizing the goal state of the environment at the training time step using an embedding neural network, wherein the embedding neural network is configured to process an observation to generate an embedded representation of the observation; and generating a reward for the training time step using the embedded representation of the observation characterizing the current state of the environment at the training time step and the embedded representation of the observation characterizing the goal state of the environment at the training time step; and training the action selection neural network based on the reward for the training time step using a reinforcement learning technique.

2. The method of claim 1, wherein generating the reward for the training time step comprises:

determining a similarity between the observation characterizing the current state of the environment and the observation characterizing the goal state of the environment using: (i) the embedded representation of the observation characterizing the current state of the environment, and (ii) the embedded representation of the observation characterizing the goal state of the environment; and determining the reward for the training time step based on the similarity between the observation characterizing the current state of the environment and the observation characterizing the goal state of the environment.

3. The method of claim 2, wherein determining the similarity between the observation characterizing the current state of the environment and the observation characterizing the goal state of the environment comprises:

obtaining one or more decoy observations, wherein each decoy observation characterizes a past state of the environment;

for each decoy observation, generate an embedded representation of the decoy observation by processing the decoy observation using the embedding neural network;

determine the similarity between the observation characterizing the current state of the environment and the observation characterizing the goal state of the environment using: (i) the embedded representation of the observation characterizing the current state of the environment, (ii) the embedded representation of the observation characterizing the goal state of the environment, and (iii) the embedded representations of the decoy observations.

4. The method of claim 3, wherein determining the similarity between the observation characterizing the current state of the environment and the observation characterizing the goal state of the environment comprises:

for each decoy observation, determining a similarity metric between the embedded representation of the observation characterizing the current state of the environment and the embedded representation of the decoy observation;

determining a similarity metric between the embedded representation of the observation characterizing the current state of the environment and the embedded representation of the observation characterizing the goal state of the environment; and determining the similarity between the observation characterizing the current state of the environment and the observation characterizing the goal state of the environment using the determined similarity metrics.

5. The method of claim 4, wherein the similarity metric is an inner product.

6. The method of claim 2, wherein determining the similarity between the observation characterizing the current state of the environment and the observation characterizing the goal state of the environment comprises:

evaluating a similarity metric between the embedded representation of the observation characterizing the current state of the environment and the embedded representation of the observation characterizing the goal state of the environment.

7. The method of claim 2, wherein the training further comprises:

determine a gradient of a loss function that depends on the determined similarity between the observation characterizing the current state of the environment and the observation characterizing the goal state of the environment; and adjust current values of embedding neural network parameters using the gradient.

8. The method of claim 1, wherein the training further comprises, at one or more of the plurality of training time steps:

determining the observation characterizing the goal state of the environment by sampling from a goal buffer, wherein the goal buffer comprises a plurality of past observations.

9. The method of claim 8, wherein the training further comprises, at one or more of the plurality of training time steps:

updating the goal buffer by replacing a randomly selected observation from the goal buffer by a current observation with a predetermined probability.

10. The method of claim 8, wherein the training further comprises, at one or more of the plurality of training time steps:

randomly selecting a candidate observation from the goal buffer;

determining whether to replace the candidate observation by a current observation based on: (i) an aggregate similarity measure between the current observation and the observations included in the goal buffer, and (ii) an aggregate similarity measure between the candidate observation and the observations included in the goal buffer.

11. The method of claim 1, wherein the action selection neural network is a Q neural network and the action selection policy comprises a respective Q value for each action in the predetermined set of actions.

12. The method of claim 11, wherein at each of the plurality of time steps, selecting an action comprises selecting an action with a highest Q value.

13. The method of claim 1, wherein at each of the plurality of time steps, selecting an action comprises selecting the action in accordance with an exploration policy.

14. The method of claim 1, wherein the action selection neural network and the embedding neural network are jointly trained.

15. The method of claim 1, wherein at each of the plurality of time steps, the observation characterizing the current state of the environment at the time step comprises one or more of: image data, video data, point cloud data, temperature data, motor current data, voltage data, or power data.

16. The method of claim 1, wherein the agent selects actions to be performed in a real-world environment, wherein the real-world environment comprises a data center environment, a power distribution environment, a water distribution environment, or a manufacturing plant environment.

17. The method of claim 1, further comprising, for each of one or more of the plurality of training time steps:
receiving an external reward for the training time step;
wherein the reward for the training time step is generated based at least in part on the external reward for the training time step.

18. The method of claim 1, wherein the embedded representation of the observation characterizing the goal state of the environment is generated once at a first training time step and reused at each subsequent training time step.

19. A system comprising:
one or more computers; and
one or more storage devices communicatively coupled to the one or more computers, wherein the one or more storage devices store instructions that, when executed by the one or more computers, cause the one or more computers to perform operations comprising:
selecting actions to be performed by an agent that interacts with an environment by performing actions from a predetermined set of actions, comprising, at each of a plurality of time steps:
receiving an observation characterizing a current state of the environment at the time step and an observation characterizing a goal state of the environment at the time step;
processing the observation characterizing the current state of the environment at the time step and the observation characterizing the goal state of the environment at the time step using an action selection neural network to generate an output comprising an action selection policy; and
selecting an action from the predetermined set of actions to be performed by the agent at the time step using the action selection policy;
wherein the action selection neural network has been trained by operations comprising, for each of a plurality of training time steps:
receiving an observation characterizing a current state of the environment at the training time step and an observation characterizing a goal state of the environment at the training time step;
processing the observation characterizing the current state of the environment at the training time step and the observation characterizing the goal state of the environment at the training time step using an embedding neural network, wherein the embedding neural network is configured to process an observation to generate an embedded representation of the observation; and
generating a reward for the training time step using the embedded representation of the observation characterizing the current state of the environment at the training time step and the embedded representation of the observation characterizing the goal state of the environment at the training time step; and
training the action selection neural network based on the reward for the training time step using a reinforcement learning technique.

20. One or more non-transitory computer storage media storing instructions that when executed by one or more computers cause the one or more computers to perform operations comprising:
selecting actions to be performed by an agent that interacts with an environment by performing actions from a predetermined set of actions, comprising, at each of a plurality of time steps:
receiving an observation characterizing a current state of the environment at the time step and an observation characterizing a goal state of the environment at the time step;
processing the observation characterizing the current state of the environment at the time step and the observation characterizing the goal state of the environment at the time step using an action selection neural network to generate an output comprising an action selection policy; and
selecting an action from the predetermined set of actions to be performed by the agent at the time step using the action selection policy;
wherein the action selection neural network has been trained by operations comprising, for each of a plurality of training time steps:
receiving an observation characterizing a current state of the environment at the training time step and an observation characterizing a goal state of the environment at the training time step;
processing the observation characterizing the current state of the environment at the training time step and the observation characterizing the goal state of the environment at the training time step using an embedding neural network, wherein the embedding neural network is configured to process an observation to generate an embedded representation of the observation; and
generating a reward for the training time step using the embedded representation of the observation characterizing the current state of the environment at the training time step and the embedded representation of the observation characterizing the goal state of the environment at the training time step; and
training the action selection neural network based on the reward for the training time step using a reinforcement learning technique.

* * * * *